Dec. 14, 1926.
S. G. THOMSON
1,610,395
CONVERTIBLE RAIL HIGHWAY WHEEL STRUCTURE
Filed Nov. 28, 1925    6 Sheets-Sheet 1
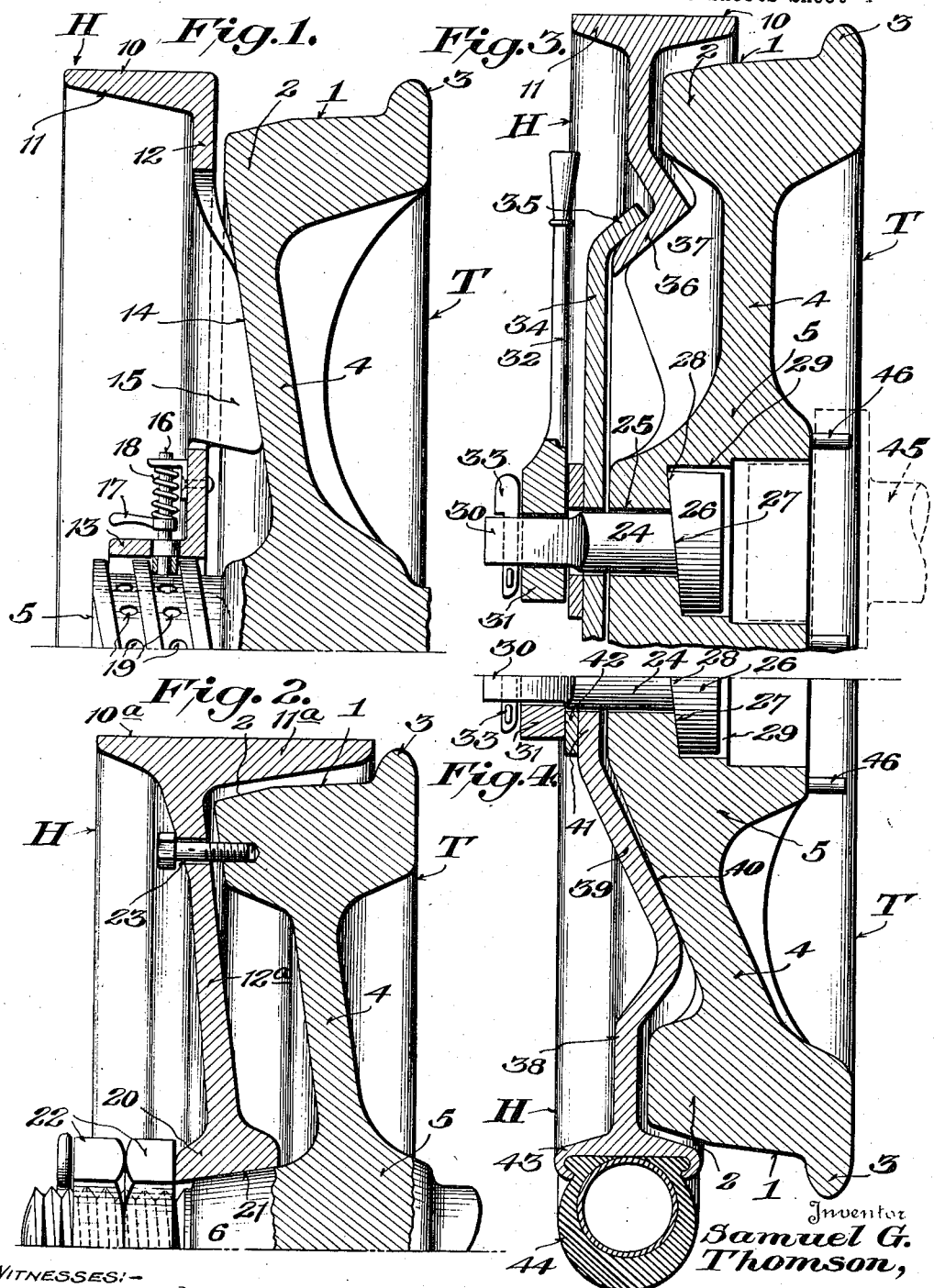
Inventor
Samuel G. Thomson

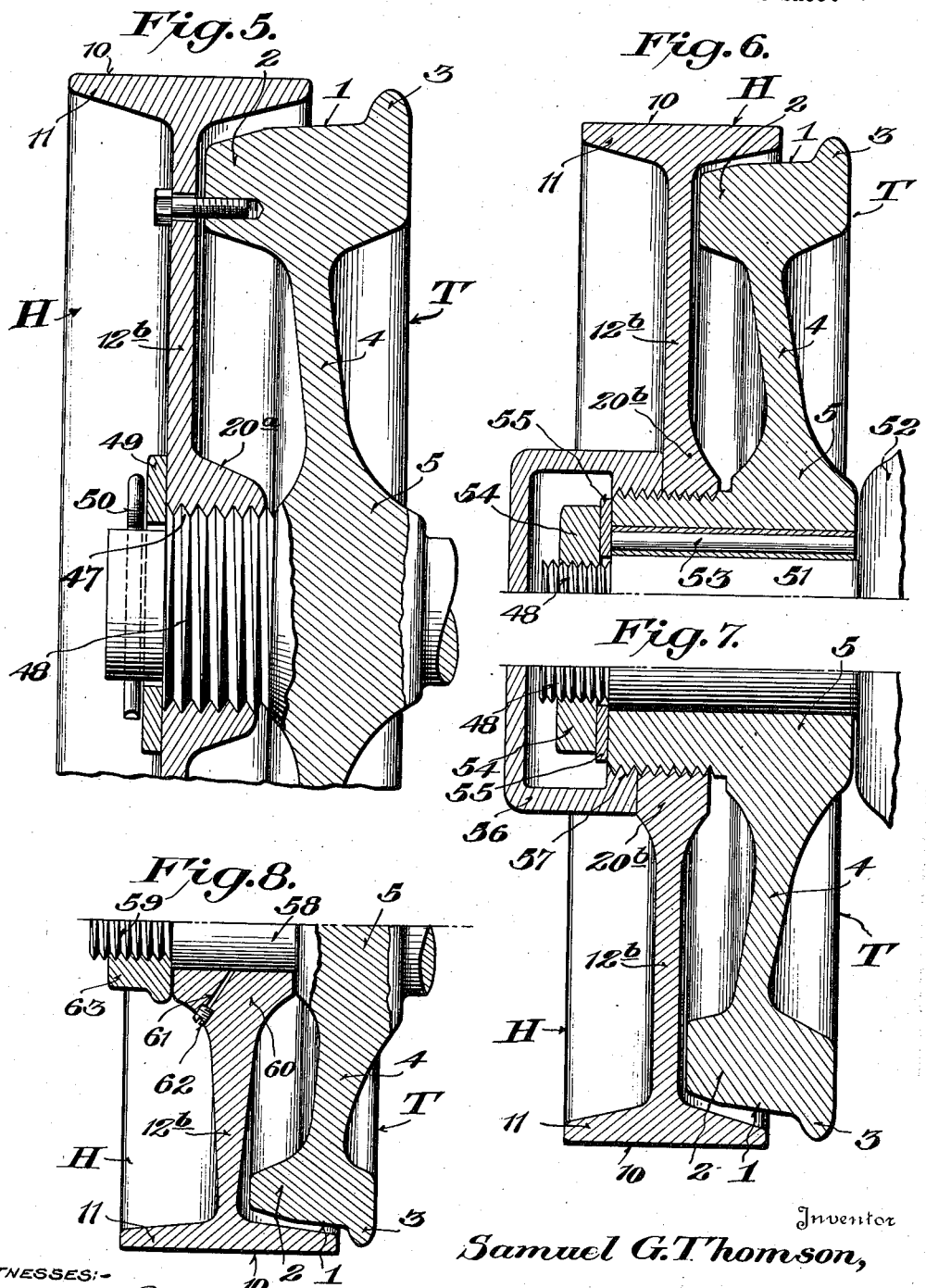

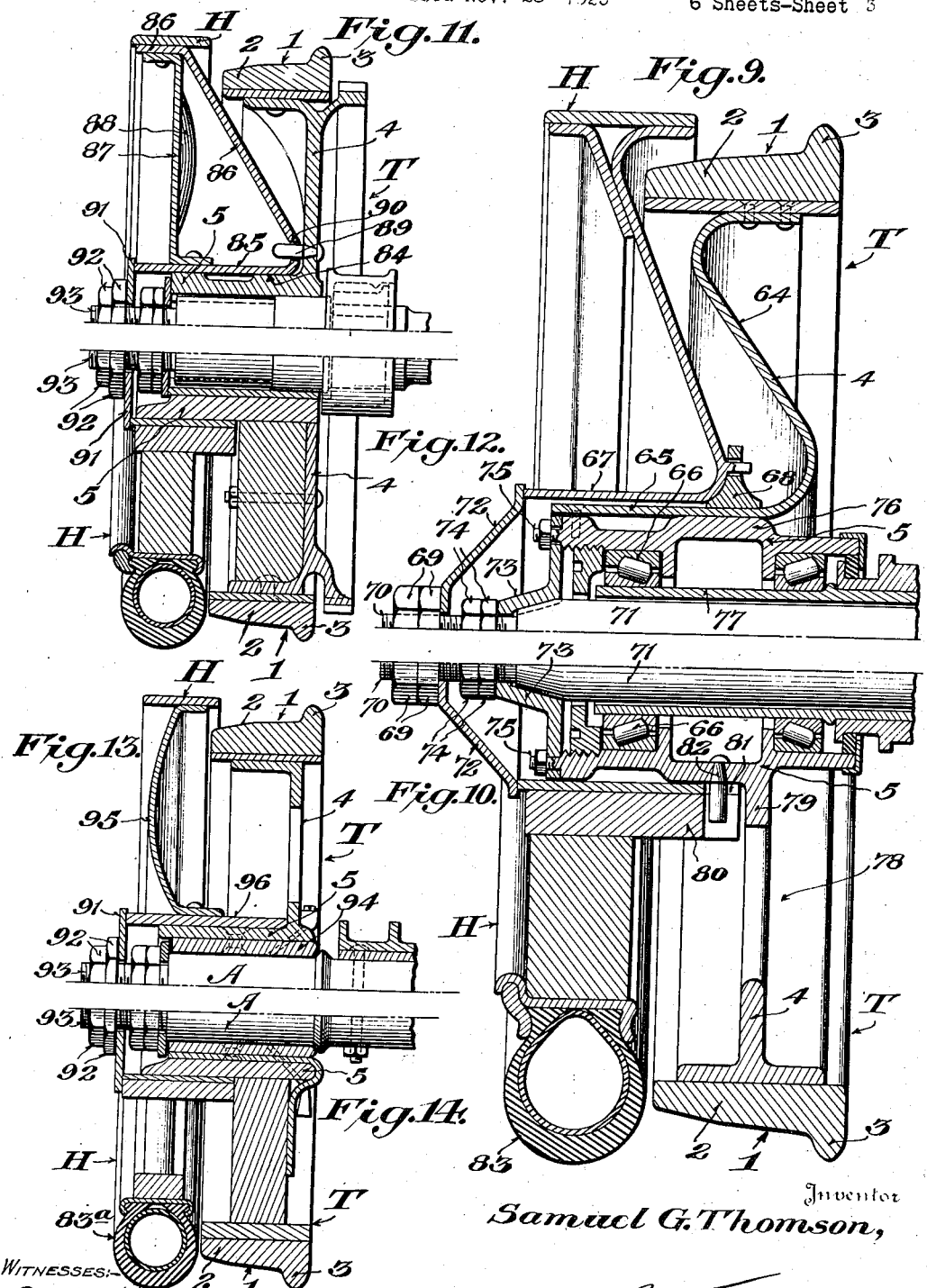

Dec. 14, 1926.
S. G. THOMSON
1,610,395
CONVERTIBLE RAIL HIGHWAY WHEEL STRUCTURE
Filed Nov. 28, 1925    6 Sheets-Sheet 4
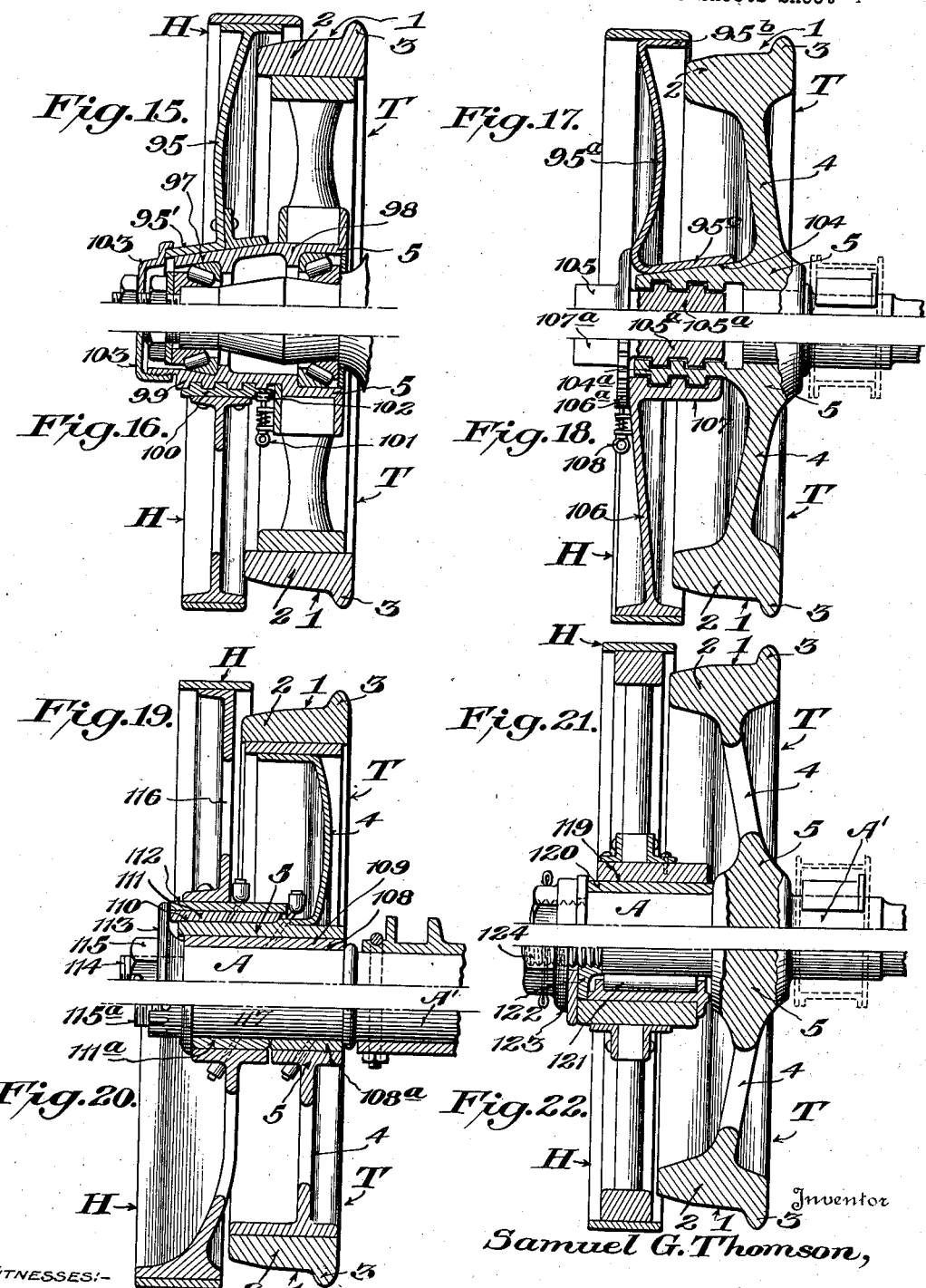

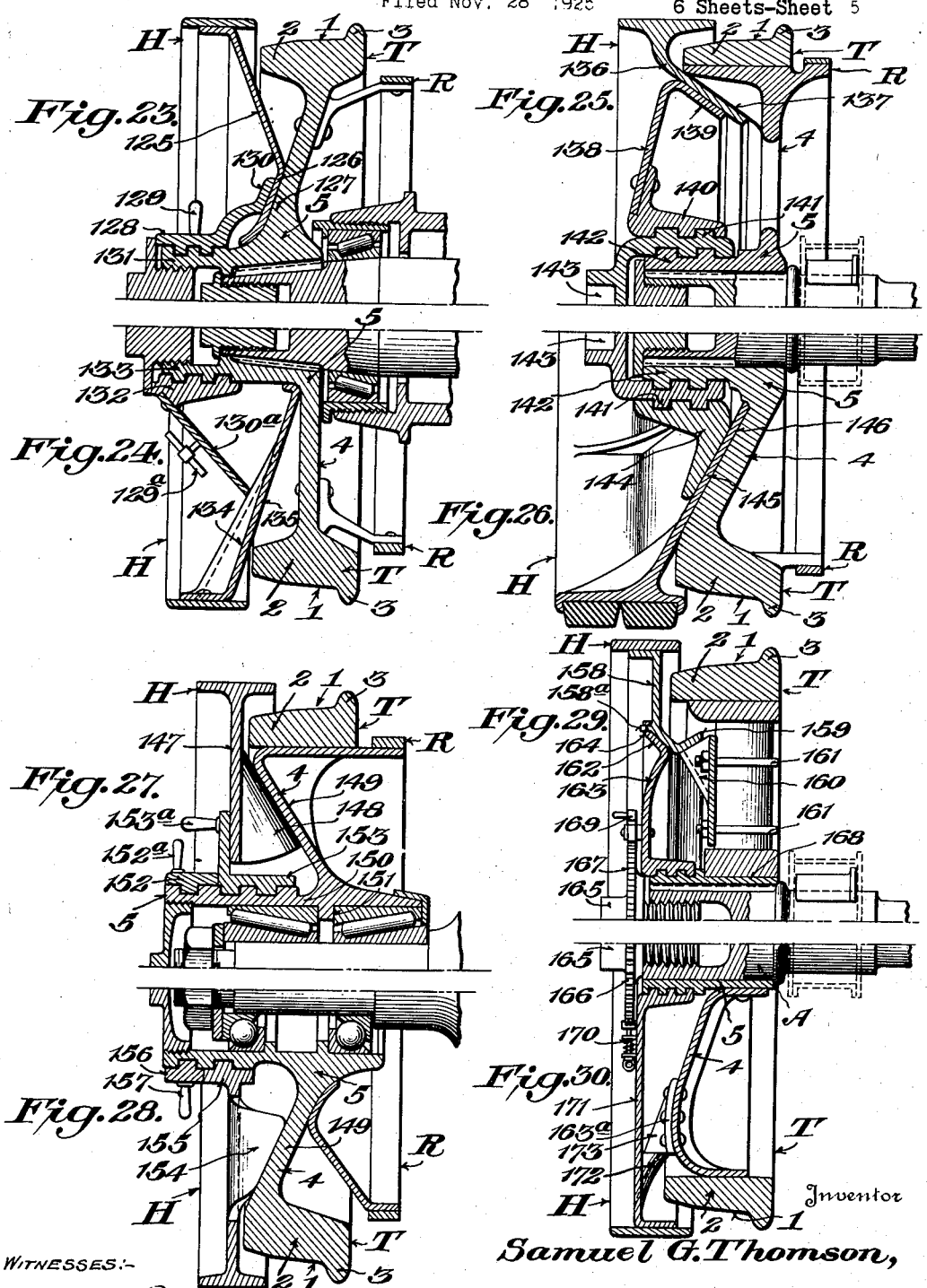

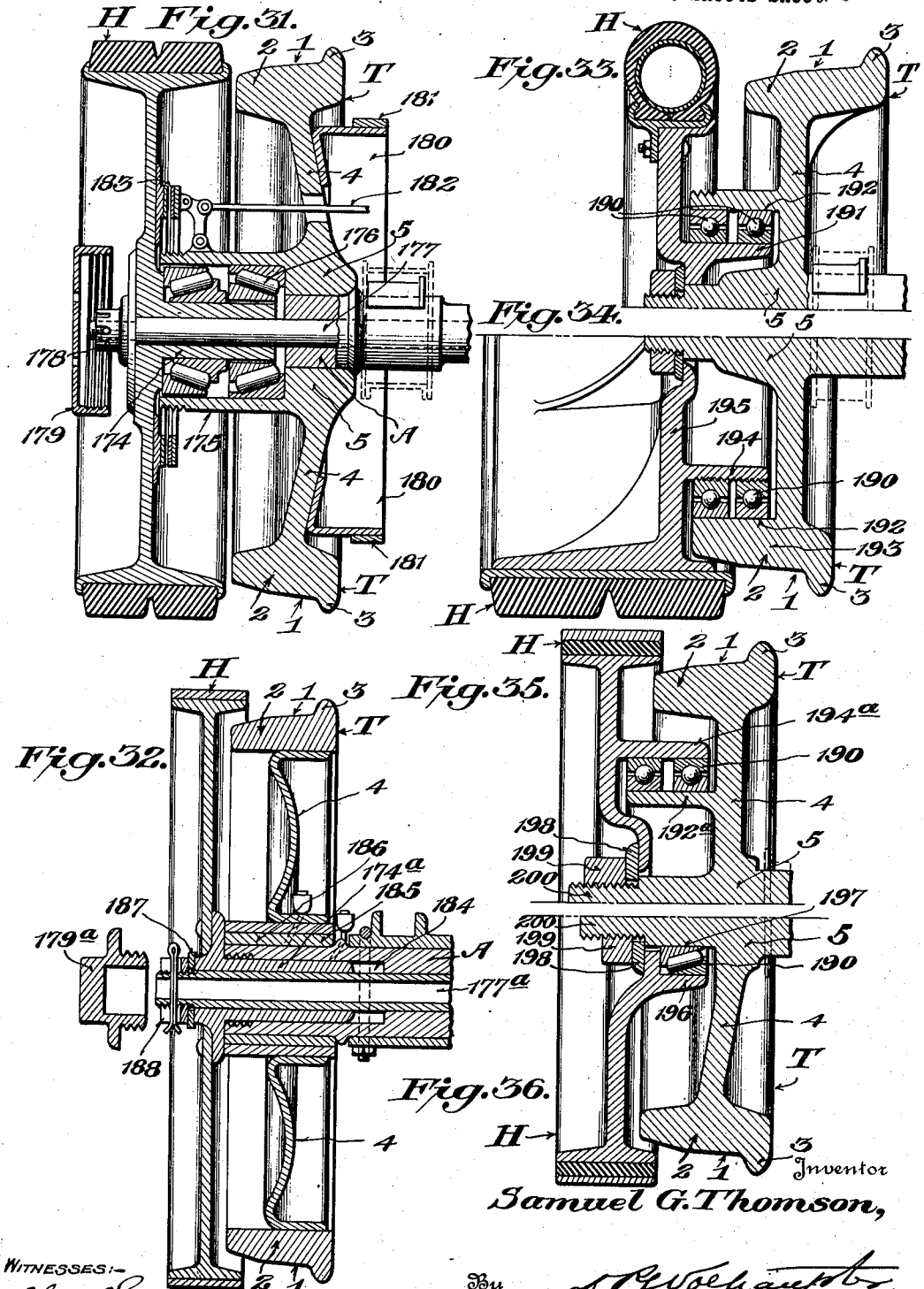

Patented Dec. 14, 1926.

1,610,395

UNITED STATES PATENT OFFICE.

SAMUEL G. THOMSON, OF NEW YORK, N. Y.

CONVERTIBLE RAIL-HIGHWAY WHEEL STRUCTURE.

Application filed November 28, 1925. Serial No. 72,001.

This invention relates to convertible wheel structures adapted for use either upon tracks or highways to facilitate the change of a vehicle to which it is applied from rail to highway service and vice-versa.

Having in view such conversion of a wheel, respectively for use on highways and railway tracks, one of the primary objects of the invention is to provide a novel manner of seating the highway member on or against the car wheel or track member, preferably through the medium of providing for the highway member a central or hub contact or both with the car wheel or track member, and to associate therewith novel and effective clamping means for maintaining that relation, the parts of the clamping means being relatively light and easy to handle. Also in that connection the invention recognizes that quick and easy conversion in a wheel, having this dual function of railway track service and highway service, is essential to its practicability and successful use, and consequently an important factor of the invention is the character of the clamping means for securing and holding the coacting wheel members in the relation referred to.

There are many kinds of flanged car wheels for railway tracks, those having solid webs instead of spokes, being particularly adapted for the application of a highway attachment which has its bearing on the central portion of the wheel, while wheels with either solid webs or spokes are equally well adapted for highway wheel attachments bearing on the hub portions or on both the hub and web portions. The smaller sizes of wheels are especially adapted to have the highway member bearing on the web or hub portions. The highway member which virtually becomes a secondary wheel comprising rim, web and hub portions would involve much weight in the large wheel sizes.

The highway wheel member comprising a part of this invention has central web or spoke and hub contact with the track wheel and is therefore best adapted to the smaller sizes of wheels, and also to hub contact when spoked wheels are used. This central and hub contact facilitates the designing of effective clamping means which are relatively light and easy to handle.

In carrying out these objects, the invention is susceptible of a wide range of modification without departing from the spirit or sacrificing any of the advantages of the claimed invention; but for illustrative purposes there are shown in the drawings certain preferred and practical forms, in which:

Figure 1 represents a transverse sectional view of a portion of a flanged car wheel showing one form of highway member in connection therewith and which is constructed with hub and web engaging portions constituting the means for fastening the highway member to the car wheel.

Figure 2 is a similar view showing a different form of the invention which is also a simplification thereof.

Figures 3 and 4 are similar views showing a novel form of wedge holding or clamping means which may be employed respectively with different forms of highway members.

Figure 5 is a sectional view of a portion of a flanged car wheel showing a modified form of highway member which is constructed with a hub element constituting a part of the holding means for fastening the highway member to the car wheel.

Figures 6, 7 and 8 are similar sectional half views respectively illustrating different modifications in the hub construction of that type of highway member having a hub element for attachment to the hub part of a flanged car wheel.

Figure 9 represents a half sectional view showing still another form of the invention in which the hub contact only is employed.

Figures 10, 11, 12, 13 and 14 are views similar to Fig. 9 showing still other forms of hub contact connections.

Figures 15 to 22 inclusive show cross-sectional half views of car wheels and highway members in which the hub contact connection is employed, said views illustrating slightly different forms of the invention.

Figures 23 to 28 inclusive represent cross-sectional views showing various forms of highway attachment and clamping means which emphasize a few of the different forms of co-acting fitting faces and locations of contact between the highway attachment and car wheel and in which the contact between these members is at the central or web portion of the car wheel.

Figure 29 is a cross-sectional half view of a car wheel showing the highway member applied thereto and in which a central contact only between such members is used.

Figure 30 is a similar view showing a slightly different form of central contact connection.

Figures 31 and 32 are cross-sectional views similar to Figs. 19 to 22 in which the highway wheel and car wheel revolve independently of each other and have their own bearing and journal surfaces.

Figures 33 to 36 inclusive represent cross-sectional half views of a car wheel showing the duplex or double bearing type in which the co-acting faces between the highway wheel and the car wheel provide the additional bearing.

Like reference characters designate corresponding parts throughout the several figures of the drawings.

In carrying this invention into effect it is proposed to apply the highway member designated generally as H to a flanged car wheel T which is broadly included in the term track wheel as herein used, the same including the usual tread portion 1, rim 2, flange 3, web 4 and hub 5. In that connection it is to be noted that one of the distinctive features of this invention resides in so mounting the highway member H that it has a bearing engagement or contact on or with the hub or web only or both, of the track wheel so that it will not at any time contact with the rim of the track wheel, which is the portion affected by wear. Therefore, a feature fundamental to all forms of the invention, and shown in the various examples represented in the several figures of the drawings, is that of evenly and firmly seating and securing the highway member on or against the car wheel or track member at or on the hub and against the web portion of the track wheel, or at either of those locations, and the clamping means which are utilized in carrying out the invention are designed and arranged to effectively maintain that relation between the highway member and the car wheel or track member.

In Figs. 1 to 8 the highway member H is applied to the strictly railway type of car wheel while the other figures include automobile and other hybrid rail-highway types.

In the hub only contact forms illustrated in Figs. 2 and 5 to 22 inclusive, and in Figs. 32 and 36 the highway member virtually becomes a complete supplementary wheel having rim, web and hub portions and may be divided into two classes, one in which the highway wheel is clamped against and revolves with the track wheel, and in the other the two wheels revolve independently on separate journals, the contacting faces of the two wheels in the latter class being preferably in the form of cylindrical bearings while in the first mentioned class the co-acting faces may be either conical clamping faces or loose fitting load carrying cylindrical faces which allow the hub of one wheel to slip over the hub of the other and to normally engage an upright web bracket or spoke portion.

The type of track wheel used whether of disk form pressed from light plate or of cast, tubular, or of reinforced web and rib design, or of the usual wooden spoke construction is an important factor in determining the best point and method of contact of one wheel with the other.

The mounting of the wheel on the axle or wheel pin or swinging pivot is also another factor in determining the most practical design of highway, track member and clamping means. The type of bearing best suited to the particular service and the relation and relative location of these bearings with each other and with the two wheels must also be considered.

It will thus be seen that the large number of factors involved render possible an indefinite number of practicable designs within the scope of this invention, the various figures being intended only to illustrate several of the most desirable combinations of parts and each figure or group of figures typify a particular line of development.

Another feature to be considered in designing the wheels and clamping parts is the method of drive for the wheels not used as trailing or loose running wheels. Since the driving mechanism and its connection to the wheels is connected only indirectly with this invention as is also the form and relative location of the bearings a general grouping of the figures into three distinct types of vehicle construction has been made in order to simplify the description.

The usual automobile construction for central differential enclosed drive with roller bearings, is shown in Figs. 9 and 10, the load being carried to the bearings by a tube integral with the housing which encases the drive shaft.

In the second type of construction the wheel is pressed on or keyed to a revolving axle and may be used either as a loose running trailer or may be chain driven and this form is illustrated in Figs. 11, 12, 17, 18, 21, 22, 25, 26, 29, 30 and 31. In this form the load is superimposed upon a journal box located inside of the wheel and containing bearings and lubrication similar to that used for railway engine trucks.

Figures 23 and 24 show this same combination of tight wheel and revolving axle but in this design roller bearings are substituted for the journal box, the load being carried to the top of the bearing by a projection from the vehicle frame or spring carrier. A sprocket or rack wheel R is shown attached to the car wheel for chain drive which may be omitted if the wheel is used as a trailer.

In the third type of construction the wheel is mounted on a fixed axle or swinging pivot which does not revolve with the wheel and this form of wheel is shown in Figures 13 and 14, 19 and 20 and 32. This form shows the fixed axle such as is usually fastened directly to the vehicle body or indirectly through the spring rigging in wagon and heavy automobile truck construction.

In Figures 15 and 16, 27 and 28 roller and ball bearing wheel mounts are shown for rigid or swinging pivots such as is generally used in automobile designs.

In all of these three types of construction it is obvious that the various wheels may be altered to driven or trailing types without departing from the spirit of the invention; also that the various types of wheels may be used in different combinations with roller and ball bearings or with wagon or car journal types having lubricated bronze and soft metal bearings since no novelty is claimed for these types of wheels, axles and bearings, except the double bearing or duplex construction which is shown in Figs. 19, 20, 21, 22, 31 to 36.

In the embodiment illustrated in Fig. 1 a rigid construction of highway member H is shown which can be readily manufactured or developed from a light rolled or spun channeled disk which can be pressed from light weight sheet steel, while the engaging bearings with the car wheel are rigid, well spaced, and well adapted for carrying and transferring the load. The highway member H shown in this figure is formed of a channel section with its outer flange 10 providing the wheel tread 11 and the inner flange or web 12 thereof is provided or formed with a hub member 13 arranged over the hub extension 5 of the car wheel T. The web or flange 12 of the channel type highway member H is shown in this figure as formed with a circular series of radially extending bearing tongues 14 which are of substantially triangular formation and are formed by slitting of the web of the highway member and pressing or deflecting the tongues 14 away from the channeled side of the highway member by turning them around an approximately radial axis, thereby forming inclined engaging portions to make contact with the car wheel. The inclined engaging portion 15 is formed along the side or side edge of the tongue, and the inclined engaging portion 15 of these tongues engage and abut an inclined part of the web of the car wheel.

In this form of the invention the flange 10 forming the tread for the highway wheel does not overlie the car wheel tread but is turned in a direction away from the car wheel. This feature of construction is of practical importance because it increases the width between the treads of the pair of highway wheels over the width between the pair of car wheels, thus providing a greater resistance to rocking of the load while traveling over uneven or irregular highway surfaces.

The holding means for the highway member shown in this form of the invention may consist of a latch pin 16 provided with a suitable handle 17 and adapted to be held by a spring 18 in engagement with keeper holes 19 formed in the car wheel hub extension 5 between the coarse threads of such extension.

In this form of construction, the latch can be lifted entirely free from the threads of the hub of the car wheel extension so that the highway attachment or member can be pulled straight off, or pushed straight on, instead of requiring several complete revolutions as would be necessary with fully engaged threads. When the highway attachment is turned "home" that is against the car wheel, the latch is allowed to drop between the threads, and the member H is revolved into a tightly binding position until the latch pin drops into the nearest keeper hole 19, thus holding the two wheels tightly together until the latch is again released in order to remove the highway wheel.

In the form shown in Fig. 2 the highway member H is in the form of a complete wheel in which the rim $11^a$ with its flat tread $10^a$ is carried by a web portion $12^a$ which has formed therewith a central hub portion 20 preferably having a tapered inner bore 21 fitting over a correspondingly tapered nose 6 at the outer side of the car wheel hub and held in place by suitable locking nuts 22.

There is also shown in this form of construction a lock bolt 23 extending through the web of the highway member and engaging the car wheel which serves to prevent independent relative movement of the two members. This bolt may or may not be used without affecting the invention.

The holding device shown in Figures 3 and 4 obviates the use of threaded members of all kinds and provides a quick detachable construction which admits of the highway member H being readily brought into use or removed. This holding device is of the wedge type and essentially consists of a rotatable stem 24 mounted to turn in a bearing hole 25 formed in the hub of the car wheel and carrying at its inner end a wedging head 26, one face of which is beveled or inclined as shown at 27 to operate against a correspondingly beveled or inclined abutment face 28 formed at the bottom of a seat or socket 29 in the inner side of the car wheel hub. The outer end of the rotatable stem 24 may conveniently be of angular formation as shown at 30 to removably receive thereover the perforated heel or end 31 of an operating lever 32 which lever is detachably held in place by a pin or key 33.

In the adaptation of the invention shown in Fig. 3 the wedging holding device just described cooperates with a clamping plate 34 having an inturned holding edge or flange 35 that clamps upon an angular clamping foot 36 which is held by the plate 34 clamped upon an inclined or angularly disposed abutment shoulder 37 formed on and at the outer side of the car wheel. The said angular clamping foot 36 is formed at the inner edge of the web 37 of a highway member which otherwise has the other features of the invention hereinbefore described.

In the adaptation of the wedging holding device to the form shown in Fig. 4 the highway member H is formed with a web 38 deflected at an intermediate point to provide an inclined bearing element 39 engaging a correspondingly inclined clamping face 40 of the web of the car wheel. The highway web member 38 is formed at its inner edge with a clamping flange 41 against which may directly bear the washer 42 with which the heel or end 31 of the operating lever 32 directly engages.

In both these forms of construction shown in Figs. 3 and 4 it will be seen that by grasping the lever or handle 32 and rotating the stem 24 the wedging action of the head 26 against the seat or abutment 28 will serve to tightly and rigidly clamp the parts so as to hold the highway member in its operative position.

In the form shown in Fig. 4 the highway member is shown as provided with a clincher rim or equivalent form of construction 43 adapted to carry a pneumatic or cushioned tire 44. The dotted lines in Fig. 3 represent the axle 45 of the vehicle to which the flanged car wheel is separately fastened by means of pins or equivalent elements 46.

The form illustrated in Fig. 5 is similar to that shown in Fig. 2 in which the highway member is illustrated as a complete wheel, the web portion 12$^b$ of which being provided with a central hub element or part 20$^a$ which is interiorly threaded as around 47 for engagement with the threaded spindle 48 formed at the outer side of the car wheel hub. In this form of construction the highway member is screwed on and off of the threaded spindle 48 of the car wheel hub, and in its operative position with relation to the car wheel may be held by any suitable fastening means such as the washer 49 and the cotter pin 50.

Another variation of the invention which may be resorted to is shown in Figs. 6 and 7 wherein the flanged car wheel T may be mounted for free rotation upon a supporting journal and gudgeon 51 carried by the frame or axle member 52 of the vehicle. Such mounting of the flanged car wheel may be directly on the supporting journal or gudgeon 51 as shown in Fig. 7, or with roller or equivalent antifriction bearings 53 interposed between the bore of the car wheel and the journal or gudgeon as shown in Fig. 6. In either of the forms shown in Figs. 6 and 7 the highway member may be substantially similar to that shown in Fig. 5 with its web 12$^b$ provided with a threaded hub 20$^b$ engaging the thread of the threaded spindle projecting outward from the hub of the car wheel. In this form of the invention an ordinary nut and washer 54 and 55 is shown for holding the car wheel upon its threaded journal or gudgeon and a hub cap 56 provided with a threaded flange 57 engaging the threads of the spindle 48, thereby providing a holding means for securing the highway member in its operative position and also serving as a cover for the nut and washer which holds the car wheel on its journal.

A simplification of the form of construction shown in Figures 6 and 7 is illustrated in Figure 8 of the drawings in which the flanged car wheel is shown provided at its outer side with a cylindrical supporting journal or gudgeon 58 having a threaded tip 59 which permits of the use of the highway member provided with a bearing hub 60 rotatably mounted on the supporting journal or gudgeon 58 of the car wheel and preferably having a lubricating passage 61 closed by a plug 62 or equivalent device.

In the form shown in Fig. 9, the track wheel T is made in the form of a plate disk 64 S-shaped in cross-section and having a tubular hub portion 65 which encloses roller bearings 66 and the outer surface of which is enveloped by a loosely sliding tubular hub 67 of a plate disk highway member H, all the parts of which except the hub and interlocking device of said highway member stand entirely free from the car wheel. The highway member is held tightly against the interlocking bracket 68 of the car wheel by jam nuts 69 threaded on a projection 70 of the drive shaft 71. These nuts exert their clamping action through a cupped disk 72 engaging the edge of the hub of the highway member. Another cupped plate 73 keyed to the end of the drive shaft and held by two additional jam nuts 74 is bolted to studs 75 projecting from the hub casting 76 of the car wheel. This car wheel casting 76 carries the load through the roller bearings to the tubular casing 77 surrounding the drive shaft 71 and which is attached to the drive axle housing. The cupped drive connection, jam nuts and roller bearings are not disturbed in removing and applying the highway member.

In Fig. 10 the same clamping arrangement is shown as in Fig. 9 the only difference being that a ribbed cast wheel 78 affords an abutting web 79 against which is clamped the metal lined wooden hub 80 of the highway member H. Slots 81 in the inside edge of the highway hub interlock with a pin 82 extending through the cylindrical hub fitting face of the car wheel which prevents relative rotary movement of these members. In this form of the invention the highway member H is of the usual wooden spoke wheel construction equipped with a pneumatic tire 83 and all portions of this highway member except the hub portion stand free from the car wheel.

In Fig. 11 of the drawing a cast car wheel T is shown having cylindrical fitting faces 84 for the tubular hub 85 of a highway member H which is made in the form of a conical plate disk 86 supported by an upright strut member 87 stiffened by radial displacements 88 at intervals around the wheel. This braced and flanged construction allows thinner plates to be used for a given load than would be permitted with the design shown in Fig. 9.

A bolt or stud 89 projects laterally from the upright car wheel web 4 to engage an interlocking hole 90 in the highway member H to prevent relative rotary movement of the car wheel and the highway member. A flat clamping plate 91 holds the highway member in operative position against the car wheel and is secured by jam nuts 92 threaded on a stud 93 projecting from the axle. It will thus be seen that the highway wheel member H stands free from all contact with the car wheel except at its hub and inner portion of its web.

The form shown in Fig. 12 is similar to that shown in Fig. 11 except that the highway wheel H is made in the form of a metal bushed wooden spoke wheel which fits over the hub of a combination cast and wooden car wheel, the clamping device being the same as shown in Figure 11. The contacts and clearances between the highway member and the car wheel in this form are also the same as that shown in Fig. 11.

In the form shown in Figures 13 and 14 the same fitting faces, clearances and clamping means are illustrated as those shown in the other figures the car wheel T being of the type having a lubricated surface journal and bearing 94 providing a loose running wheel on a fixed axle A as distinguished from a wheel keyed to a revolving axle as shown in Figs. 11 and 12, and a wheel internally driven as shown in Figs. 9 and 10.

The highway member H illustrated in Fig. 13 is of a thin pressed plate construction having its web 95 concave on its inner face and attached to a cylindrical hub member 96.

In Fig. 14, the usual wooden spoke wheel is shown equipped with a pneumatic tire 83ª for highways and the standard flanged tire for track service.

In the forms shown in Figs. 2 and 8 to 14, the fitting faces of the highway member with the car wheel have been loose sliding cylindrical surfaces.

In Fig. 15 is illustrated a disk highway member H having a hub 95' fitting a conical face 97 of a cast car wheel hub 98 to which is secured a wooden spoked car wheel or truck wheel equipped with a flanged steel tire. All portions of the highway wheel H except the hub fitting surfaces stand free from contact with the car wheel and the clamping means employed in this form are similar to those shown in Figs. 9 and 10.

In the form shown in Fig. 16 the same type of car wheel is illustrated as that shown in Fig. 15 except that in this design a hub casting 99 is provided having an outside thread to engage a similar thread inside the hub 100 of the highway member H. This internally threaded hub 100 of the highway member is secured to an angular portion of an I-beam section the outer flanges of which form the wheel rim. A spring latch 101 fastened to the car wheel hub plate engages a rack 102 mounted on the edge of the highway hub and which prevents relative rotation of the car wheel and highway member. The usual hub cap 103 encloses the bearings.

In Fig. 17 another form of thin plate disk highway member H is shown the web 95ª of which has a concave outer face and inwardly extending flanges 95ᵇ and 95ᶜ which form attaching means for connecting the highway member with the car wheel and the web with the tread of the highway member. The flange 95ᶜ forms a conical fitting face to engage a similar face of the car wheel hub as shown at 104 and against which the highway member is clamped by a squared collar bolt 105 threaded into the hollowed car wheel hub. It will be obvious that in this form of wheel the highway member also stands entirely free from the car wheel except for its conical hub contact.

In Fig. 18 the highway member H is shown having its rim and web portions forming a T section 106 which merges at its inner end into an inwardly extending hub portion 107. This hub portion is equipped with an internal left-hand thread to engage a similar thread around the outside of the car wheel hub 104ª. The car wheel hub 104ª has an interior right-hand thread to engage a central clamping bolt 105ª which carries a clamping collar 106ª and is provided with a squared wrench end 107ª. The clamping collar 106ª is notched around its edge to receive a spring latch 108 carried by the highway member. It will be noted in this locking arrangement that a releasing rotation of the highway member acts through the latch in tightening the central clamping bolt and that the highway member contacts only with the car wheel around the hub.

In the form shown in Fig. 19 the wheel structure has two separate and independent revolving bearings one for the car wheel and one for the highway wheel, the car wheel T in this form of the invention has a lubricated surface journal 108 surrounded by a bronze bushing 109 thus producing a loose running wheel on a fixed axle A. In addition to the axle journal bearing formed by loose-running bushing 109 inside the car wheel hub there is formed around its outside another journal 110 to carry a lubricated bronze bushing 111 inserted in the hub 112 of the highway wheel member H. This wheel H thus becomes a complete wheel including its own revolving bearing. The hubs of both of these wheels are held in place by a hub cap 113 engaging a threaded projection 114 carried by the end of the axle A. The cap 113 is locked in place by a jam nut 115. The highway wheel member H in this form of the invention is constructed from an annular channel member having a series of large holes 116 in its web to reduce the weight, and it stands entirely free from the car wheel T except at its journal bearing contact. This arrangement of duplex revolving bearings reduces the journal friction one-half when the vehicle is in highway service, and when the highway wheel is removed, the journal around the outside of the car wheel hub may be protected while the vehicle is in rail service by any suitable means.

In the form shown in Fig. 20, separately revolving lubricated bearings for the rail and highway wheels are illustrated, the separate bushings 108ª and 111ª of the car wheel and highway member respectively are arranged to revolve end-to-end on an elongated journal 117 projecting from the fixed axle A'. The two wheels are complete and each independent of the other in their rotation except the abutting edges of their hubs. The outer wheel H is held in place by a combination hub cap and castle nut 115ª and when this wheel is removed, its place on the journal is occupied by any suitable protecting means. It will be obvious that with this arrangement the journal friction is the same in highway service as in track service.

In Figs. 21 and 22, separate revolving bearings for each wheel are shown, the car wheel bearing being of the engine-truck-box-type located inside of the wheel at A' on an axle A revolving with the wheel, while the highway wheel H has its journal 119 on an extension of the axle A outside the wheel. Obviously, this outside journal may also be provided by a projection of the car wheel hub. The highway wheel in these two figures is of the usual wooden wagon or truck type.

In Fig. 21 an arrangement is shown in which the usual metal bushing 120 forms the bearing surface against the journal while in Fig. 22 a roller bearing 121 is interposed between the wooden hub and the journal, and this bearing in turn is retained in place by a ring 122 engaging a threaded projection of the axle A. Any suitable means may be employed for holding the wheels in place, a retaining collar 123 and a castle nut 124 being here shown. This duplex bearing arrangement reduces the journal friction when in highway service.

The forms shown in Figs. 23 to 28 inclusive are designed to illustrate variations in structure of the highway wheel member and clamping means, having in view particularly to emphasize a few of the different forms of coacting fitting faces and locations of contact between the highway wheel and the car wheel.

In Figs. 23 and 24 a form of hub contact is shown between the highway car wheel which occurs in the fillet or crotch between the wheel hub and the web. In Fig. 23 a portion of a thin plate highway member is clamped against the combined hub and web portion of the car wheel, while the remainder of the highway member is concaved outwardly to stand entirely free from the car wheel. The web 125 of this form of highway wheel has an obtuse angled foot 126 shaped to conform with the combined hub and web portion 127 of the car wheel and which is held engaged therewith by a clamping ring 128 equipped with handles 129 and a conical arm member 130 which bears against the outer face of the foot 126 of the highway member and clamps it to the web 127 of the car wheel. This ring 128 is internally threaded to engage outside threads formed on a hollow hub extension 131 of the car wheel. This same locking arrangement embodying the jam nut principle is shown in Fig. 24 the clamping arm 130ª consisting of a thin plate cone fastened to an internally threaded ring 132 and which carries an operating handle 129ª. This threaded ring 132 engages threads on the outer face of the car wheel hub extension 133 and the peripheral edge of the cone operates as a fulcrum to support the radially flanged stiffening ribs 134 of a disk highway member, the web 135 of which engages the base of the car wheel web, all other portions of the highway wheel member being free from contact with the car wheel.

In Fig. 25 the highway member H is shown having a turned-in flange 136 to contact with the under face of stiffening rib 137 lying under the car wheel rim, the remaining part of the highway member outside the plane of the under face of the car wheel rim standing free from contact with the car wheel. A supporting cone 138 with a turned-in flange 139 clamps the depending flange of the highway member against the bearing ribs of the car wheel. This cone 138 is fastened to a ring 140 having a right hand internal thread to engage a similar thread formed on the outside of a cup shaped clamping screw 141 which screw is equipped with a left-hand internal thread to engage a similar thread around the hub 142 of the car wheel. This connection gives a double throw to the clamping mechanism since when a wrench is inserted in the socket 143 in the outer face of the clamping screw and turned to the right the screw will move outward on the car wheel hub and the clamping cone will move outward on the screw thus affording double travel in releasing the highway member.

The same clamping mechanism is employed in the form shown in Fig. 26 but in this design an interiorly threaded angular clamping member 144 engages the portion of the web 145 of the highway wheel H, which web lies in contact with the under side of a slanting car wheel web 146, the remaining portion of the highway wheel being free from contact with the car wheel rim.

In Fig. 27 the highway member H is shown made T-shaped in cross-section having portions of its inner edge or skirt 147 flanged or struck out inwardly to afford contacting elements 148 which engage the upper or outer half of the under face of the slanting car wheel web 149. The car wheel hub 150 is made exceptionally long and envelopes the roller bearing shown at 151 and is externally threaded at one end to have threaded engagement with two separate clamping rings 152 and 153 equipped with handles 152ᵃ and 153ᵃ respectively which rings operate as jam nuts in locking the highway member in operative position. The highway wheel in this form stands entirely free from the car wheel except at its inward flanged contact with the car wheel web.

Fig. 28 shows a highway attachment or wheel member contacting with the same web portion 149 of the car wheel as is shown in Fig. 27 but in this form of the invention portions around the web of the highway member are cut loose and flanged around one side of the part to be displaced as shown at 154 to present its edge as a contact for the car wheel web. The rim of the highway member and web immediately adjacent stand free from the car wheel while its hub 155 is internally threaded to operate as a part of the clamping mechanism rather than as a secondary fitting face to carry the load. A locking ring 156 with handles 157 acts with the threaded hub as a jam nut.

In the form shown in Fig. 29 an abbreviated ring highway member is illustrated the web 158 of which is substantially Z-shaped with its inner edge bent back to form a flange 159 which engages the slanting face of a bearing bracket 160 fastened to the wooden spokes of the car wheel by U-bolts 161. The under face of the bent portion of the web 158 is supported by a turned back flange 162 formed on the edge of a clamping disk 163. The edge of the flange 162 is notched as shown at 164 to engage a pin 158ᵃ projecting from the highway wheel web 158 to prevent relative rotary movement. A clamping bolt 165 carrying an integral collar 166 is righthand threaded into the end of axle A while the hub portion 167 has a left-hand threaded engagement with the car wheel hub 168. A suitable pawl 169 carried by the clamping disk 163 engages a ratchet rack formed in the periphery of the collar 166 of the clamping bolt. In this form of fastening device it will be noted that any tendency of the highway member to screw off will operate through the interlocking pin and notch and thence through the ratchet in turning the clamping bolt tighter into the axle.

In the form shown in Fig. 30 the same clamping and locking mechanism is provided as is illustrated in Fig. 29 except that in this form the highway member H and clamping disk 163ᵃ are integral and a spring latch 170 is substituted for the locking pawl 169 shown in Fig. 29. The web 171 of the highway member is slit at intervals around the wheel to provide flanged portions 172 which form a bearing contact to engage the offset or seat bracket 173 fastened to the car wheel web. This bracket 173 may be placed intermittently around the car wheel or it may be continuous and its seat for the highway member projections may afford a cylindrical bearing face parallel to the axis of rotation of the car wheel or it may afford a coned bearing face so that the highway member will draw up tightly against it instead of fitting snugly over it.

In Figs. 31 and 32 wheel structures similar to those shown in Figs. 19 and 22 inclusive are illustrated in which the highway wheel H and car wheel T revolve independently and each has its own bearing and journal surfaces. In Fig. 31 the highway wheel H has an inwardly projecting hollow hub 174 inserted within a hollow outwardly projecting car wheel hub 175, roller bearings 176 being interposed between the two hubs. A tie-rod 177 extends through the two hubs and through a hollow axle A to hold a similar pair of wheels mated with them. The removal of a castle nut 178 disengages the highway wheel from the car wheel and with it may be removed the tie-rod 177 and one or both rings of the roller bearings; all the bearings may be left in the cavity and protected by a hub cap 179 while the vehicle is in railway service. The usual brake drum 180 is shown attached to the car wheel T in this form and carries around its periphery a rack 181 or a sprocket wheel for chain drive. A rod 182 is also shown extending through the car wheel in order to actuate the friction ring or clutch plate 183 arranged to engage the highway wheel. It is of course to be understood that other braking or clutch devices may be employed and that this is only an illustration, such devices being applicable to act independently on each wheel so that in combination with the double bearing arrangement each wheel can be separately controlled in whatever way may seem desirable.

In the form shown in Fig. 32 the highway wheel H also has an inwardly projecting hollow hub 174ª inserted in a hub cavity 184 formed in one end of a hollow axle A. The outer face 185 of this axle A is also finished to form a journal for the car wheel T, the hub of which wheel contains a bronze bushing 186 to engage this journal and form the usual type of lubricated bearing. This outer bearing in combination with the internal lubricated bearing affords a compact arrangement of the duplex bearing idea. In this form of the invention a tube 177ª is used instead of the solid tie-rod shown in Fig. 31. A washer 187 and castle nut 188 retains the highway wheel in operative position and a hub cap 179ª protects the interior bearing surface when the highway wheel is removed.

In these duplex designs having independently revolving bearings for the highway wheel and for the car wheel as illustrated in Figs. 8, 20, 21, 22, 31 and 32 it is obvious that both wheels of the pair may run loose on the axle or wheel pin as trailing or guiding wheels, or by the application of the usual devices either one may be independently driven by an internal shaft connecting with its hub similar to the arrangement shown in Fig. 9 or in any other desired manner. In other words both wheels may run loose, or one may run loose while the other is rigged up to be driven. It is also apparent that this same principle may be used with the highway wheel placed inside as the permanent wheel. This would be the case where the service of the vehicle was to be very largely on the highways and where conversions would be made by applying and removing a flanged wheel to take care of a limited amount of track movement. An important advantage of this flexibility in coupling up the duplex arrangement is that the wheel structure itself without resorting to auxiliary clutches, etc., provides a vehicle which has locomotion in one kind of service and which will serve as a trailer in another kind of service. For instance a vehicle might serve as an independent unit in making deliveries throughout a terminal district during one part of the day and then be handled as a trailer in trains by tractors or locomotives while in transit to and from a distant transfer or supply point. In this double service involving independent and train operation, the duplex arrangement having a separately revolving bearing for each wheel is a simple substitute for a more complicated mechainsm for relieving the driving gear from action while the vehicle is being hauled in train possibly at high speed.

In such double service it is obvious that various other designs not including the duplex bearing feature, may also be used preferably by the insertion of a clutch in the driving mechanism so that the power may be released from the wheel while the vehicle is being hauled in train or as a trailer.

The duplex bearing is a novel idea in rail-highway wheel structures and it does not invade the field of the art in which one kind of wheel is removed and another kind substituted since in this invention one kind of wheel remains permanently on the vehicle and a new type of wheel structure is provided in the duplex bearing design comprising two complete and independently revolving wheels, only one of which need be handled for complete conversion to two kinds of service. Another advantage of the duplex bearing arrangement is that in the service in which both wheels are used, journal friction is at least cut in half in the designs where both bearings are brought into action at the same time.

In Figs. 33 to 36 inclusive the duplex or double bearing type of wheel is illustrated in which the coacting faces between the highway wheel and the railway wheel provides the additional bearing. In these combinations there are two complete wheels having independent revolution which necessitates that no parts contact with each other except their intermediate bearings, which however is not a factor in the rotation of both wheels with reference to the inside journal box bearings on the revolving axle.

Intermediate bearings of the usual ball or roller form are shown at 190 in Fig. 33 lying between a finished hub 191 and the highway wheel H and a projection 192 of the railway wheel T.

In Fig. 34 these ball bearings 190 lie between an under finished surface 192 of the rim 193 of the railway wheel and a projection 194 extending laterally from the web 195 of the highway wheel.

In Fig. 35 these bearings 190 lie between projections 194ª and 192ª carried respectively by the highway wheel and the car wheel.

In Fig. 36 the roller bearing 190 lies between a projection 196 on the web of the highway wheel H and a finished hub 197 of the railway wheel. The highway wheel H is held to its working position by the usual retaining washer 198 and nut 199 threaded to a hub or axle extension 200.

Various kinds of treads are shown for these figures and obviously any desired form may be used.

It will thus be seen that in all the forms shown the contacting faces of the highway and flanged track wheels will engage only within a circle circumscribed at the juncture of the rim and the web or spokes of the car wheel and that the highway member will stand entirely free from the car wheel outside of said circle at all times thus providing for the contacting of the highway member with any portion of the car wheel except its rim.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A convertible wheel structure including a highway member and a car wheel having co-acting faces to engage within the circle circumscribed by the junction of the rim and web or spokes of said car wheel, said highway member standing entirely free from the car wheel outside of said circle.

2. A convertible wheel structure including a highway member and a flanged wheel for tracks, the latter having an overhanging outer rim, said member and wheel having engaging contact faces lying within the circle circumscribed by the juncture of the wheel spokes or web with the overhanging outer rim of said track wheel, said highway member standing entirely free from the wheel flange, and means for clamping said members together.

3. In a convertible wheel structure, a flanged track wheel and a highway member engaging said flanged wheel only within the circle circumscribed by the juncture of the wheel spokes or web portion with its rim.

4. A convertible wheel structure including a detachably connected flanged car wheel and a highway member the highway member being held entirely free from contact with any portion of the car wheel rim.

5. A convertible wheel structure including a flanged car wheel having a rim, and a highway member standing free from all parts of said rim, said highway member having a contacting face to engage the car wheel within the circle of said rim.

6. A convertible wheel structure including a flanged member for railway and a member adapted to highways, said members standing entirely free from each other adjacent to their rim portions.

7. A convertible wheel structure including a flanged member for railways, and a member adapted to highways, said members standing entirely free from each other adjacent to their rim portions and contacting with each other in their central portions.

8. In a convertible wheel structure, a flanged track wheel, and a highway member engaging said flanged member adjacent to its middle portions only, and standing entirely free from its rim.

9. A convertible wheel structure including a flanged car wheel and a highway member engaging the middle portion of said car wheel and standing entirely free from its rim, and releasable means for clamping the highway member to the car wheel.

10. A convertible wheel structure including a flanged railway car wheel, and a highway attachment having a tread member and adapted to be clamped to said wheel and to stand entirely free from its rim, at least half of the tread of said member lying outside of the plane of the normal vertical outer face of said rim.

11. A convertible wheel structure including a flanged railway car wheel, and a highway tread member adapted to be clamped against the central portion of said car wheel, at least half of the tread of the highway tread member lying outside of a vertical plane parallel to the plane of the car wheel at the outer edge of its tread.

12. In convertible wheel structure including a flanged railway car wheel, and a tread member adapted to highways and contacting with a cylindrical face of said car wheel, at least half of the tread of said member lying horizontally beyond the normal tread width of the car wheel.

13. In a convertible wheel structure, a flanged track wheel and a highway member engaging said flanged wheel adjacent its hub only.

14. A convertible wheel structure including a flanged track wheel and a highway member having co-acting faces to engage only adjacent to the hub of the track wheel, and means for clamping the highway member to the track wheel.

15. A convertible wheel structure including a highway member and a flanged wheel for tracks having contact faces adjacent to the hub to engage said highway member, all other portions of the flanged wheel standing free from the highway member.

16. A convertible wheel structure including a flanged car wheel, and a highway member having its own journal bearing.

17. A convertible wheel structure including a flanged wheel for railway tracks, and a separate complete wheel adapted to highways, one of said wheels always remaining undisturbed on its revolving journal bearing in both railway and highway service.

18. A convertible wheel structure including a flanged wheel for railway tracks, and a highway wheel having a revolving bearing. one of said wheels always remaining undisturbed on its journal in both railway and highway service.

19. A convertible wheel structure including a flanged wheel for railway tracks, and a separately revolving highway wheel, one of said wheels always remaining undisturbed on its journal in both railway and highway service.

20. A convertible wheel structure including a flanged wheel for railways, and a separately revolving highway wheel, and means whereby both of said wheels remain on their journals for one or the other of the two kinds of service.

21. A convertible wheel structure including a flanged wheel for railways, and a highway wheel, each having its own journal bearing, and both of said wheels adapted to remain on their journals in either railway or highway service.

22. A convertible wheel structure including a flanged wheel for railways, and a highway wheel, each having its own journal bearing, said flanged wheel being adapted to remain on its journal while the vehicle is in highway service.

23. A convertible wheel structure including a flanged wheel for railways, and a highway wheel having a revolving bearing, one of said wheels remaining on its journal while the vehicle is in service requiring the use of the other wheel.

24. A convertible wheel structure including a flanged wheel for railways, and a separately revolving highway wheel, one of of said wheels remaining on its journal while the vehicle is in service requiring the use of the other wheel.

25. A convertible wheel structure including a flanged wheel for railways and a separately revolving highway wheel, said flanged wheel being adapted to remain on its journal while the vehicle is in highway service.

26. A vehicle wheel keyed or fastened tightly to an axle or driving shaft, and another wheel co-axial with said wheel on the same side of the vehicle and having its own revolving bearing.

27. A pair of co-acting co-axial vehicle wheels on the same side of the vehicle and each having its hub revolving around its own bearing, said bearings revolving relative to each other.

28. A vehicle wheel having its journal bearing rotating around a revolving journal.

29. A vehicle wheel adapted to rotate around a journal which is free to revolve through another journal.

30. A vehicle wheel structure having two separate journals on the same side of the vehicle, one of said journals revolving co-axially and relatively to the other.

31. A vehicle wheel structure having two journal bearings located on the same side of the vehicle, and means adapted to retard or to stop the rotation of one while the other is free to revolve.

32. A pair of co-acting wheels on the same side of the vehicle and each having its own journal bearing, and means adapted to retard or to stop the rotation of one wheel while the other is free to revolve.

33. A pair of co-acting wheels on the same side of the vehicle and each having its own journal bearing, and braking means adapted to retard or to stop one of said wheels independently of the other.

34. A vehicle wheel having its own complete journal revolving coaxially and relatively to another complete journal on the same side of the vehicle.

35. A vehicle wheel adapted to rotate around a journal on a member, which member is free to revolve independently by means of another journal.

In testimony whereof I hereunto affix my signature.

SAMUEL G. THOMSON.